(12) United States Patent
Mahesh et al.

(10) Patent No.: US 9,128,772 B2
(45) Date of Patent: Sep. 8, 2015

(54) PERFORMANCE OPTIMIZATION THROUGH RUN-TIME QUALITY GOVERNANCE

(75) Inventors: Kavi Mahesh, Bangalore (IN); Suresh Kapanipathy Janivara, Bangalore (IN); Rujuswami Daxesh Gandhi, Bhavnagar (IN)

(73) Assignee: Infosys Limited (IN)

( * ) Notice: Subject to any disclaimer, the term of this patent is extended or adjusted under 35 U.S.C. 154(b) by 78 days.

(21) Appl. No.: 13/072,946

(22) Filed: Mar. 28, 2011

(65) Prior Publication Data

US 2012/0124199 A1    May 17, 2012

(30) Foreign Application Priority Data

Nov. 15, 2010 (IN) .......................... 3405/CHE/2010

(51) Int. Cl.
*G06F 15/173* (2006.01)
*G06F 9/50* (2006.01)
*G06F 3/06* (2006.01)

(52) U.S. Cl.
CPC ............ *G06F 9/5083* (2013.01); *G06F 3/0613* (2013.01)

(58) Field of Classification Search
USPC ....................................................... 709/224
See application file for complete search history.

(56) References Cited

U.S. PATENT DOCUMENTS

| | | | |
|---|---|---|---|
| 5,742,819 A | 4/1998 | Caccavale | |
| 6,243,761 B1 | 6/2001 | Mogul et al. | |
| 6,421,350 B1 * | 7/2002 | Szurkowski et al. | 370/419 |
| 6,775,739 B1 * | 8/2004 | Bachmat et al. | 711/114 |
| 7,020,696 B1 * | 3/2006 | Perry et al. | 709/223 |
| 8,208,395 B2 * | 6/2012 | Kotrla et al. | 370/252 |
| 8,726,284 B2 * | 5/2014 | Liao et al. | 718/102 |
| 2002/0116479 A1 * | 8/2002 | Ishida et al. | 709/220 |
| 2002/0120741 A1 * | 8/2002 | Webb et al. | 709/225 |
| 2003/0126195 A1 * | 7/2003 | Reynolds et al. | 709/203 |
| 2005/0027851 A1 * | 2/2005 | McKeown et al. | 709/224 |
| 2008/0077565 A1 * | 3/2008 | Larvet | 707/3 |
| 2008/0077570 A1 * | 3/2008 | Tang et al. | 707/5 |
| 2008/0228911 A1 * | 9/2008 | Mackey | 709/224 |
| 2009/0010264 A1 * | 1/2009 | Zhang | 370/395.21 |
| 2009/0097454 A1 * | 4/2009 | Yeou et al. | 370/332 |
| 2009/0177727 A1 * | 7/2009 | Radia et al. | 709/201 |
| 2010/0242106 A1 * | 9/2010 | Harris et al. | 726/15 |
| 2011/0099265 A1 * | 4/2011 | Antani et al. | 709/224 |
| 2011/0153770 A1 * | 6/2011 | Antani et al. | 709/208 |
| 2011/0307895 A1 * | 12/2011 | Liao et al. | 718/102 |
| 2012/0023501 A1 * | 1/2012 | Chi et al. | 718/103 |
| 2012/0191716 A1 * | 7/2012 | Omoigui | 707/740 |

* cited by examiner

*Primary Examiner* — Brian P Whipple
*Assistant Examiner* — James Edwards
(74) *Attorney, Agent, or Firm* — Lerner, David, Littenberg, Krumholz & Mentlik, LLP

(57) ABSTRACT

The present invention provides a method and system for optimizing the performance of a service according to the load on the service. The invention includes altering the quality of various sub-ordinate services that are a part of the service and in turn achieving systemic service performance levels that satisfy prescribed service level agreements.

20 Claims, 2 Drawing Sheets

PERFORMANCE OPTIMIZATION THROUGH RUN-TIME QUALITY GOVERNANCE

FIELD OF THE INVENTION

The present invention relates in general to the service industry. More particularly, it relates to performance optimization of a service by governing the quality of the service.

BACKGROUND OF THE INVENTION

Performance of a service is often an important factor in deciding the growth, competitiveness and profitability of a business utilizing or offering that service. Specifically, as more and more businesses depend on on-line services for their growth and sustenance, the domain of performance monitoring and optimization of automated systems providing these services has emerged as a key area of research and development. Generally, it is observed that peak loads affect services adversely and result in user requests being rejected or unanswered thereby, hurting customer satisfaction and business growth. Moreover, expensive resources installed to meet peak loads remain underutilized during lean periods making it difficult for businesses to justify the costs of their procurement and maintenance.

The current techniques available for optimizing the performance of a service focus on tuning the system to judiciously use the existing resources or on adding new resources on demand to maintain an acceptable quality of service. For example, for on-line services, mechanisms such as memory caching or adding web servers are used to improve the performance of the system to attain desired levels. Despite the high costs incurred in setting up such infrastructure necessary to meet specified performance criteria, sudden spikes in service requests still lead to high levels of loads that cannot be managed by the service leading to frequent "down times.".

Hence, there is a need for a method and a system of performance optimization that does not rely on adding more resources to meet the performance and scalability needs of a service. The method and the system should optimize the performance of a service platform using existing resources and at the same time continue to meet a set of base Service Level Agreements (SLAs) that are mandatory for the service. An SLA is a contract or a part of a service contract shared with the consumer of the service, in which the levels of availability, responsiveness and quality of service, in various scenarios, are formally defined.

BRIEF SUMMARY OF THE INVENTION

The present invention provides a method and a system for managing performance of a service platform, hereinafter interchangeably referred to as a server. The server is configured to receive a plurality of requests from one or more users. For example, the server can be an information retrieval system that performs a lookup of information based on the terms, semantics, conditions or combinations thereof input by a user.

According to an embodiment of the present invention, the method for managing the performance of a server is initiated by dynamically monitoring the load on the server. The load on a server is directly proportional to the number of requests received and being served by the server. Thereafter, a set of performance parameters of the server is continuously tracked. Then, the rules governing the system are analysed. Out of these, the rules which can be altered are identified. This identification is based on the conditions outlined in the request and the set of performance parameters. Finally, the identified rules are modified to alter the quality of the response. The performance parameters of the server in turn get modified and the performance of the server is managed. The modification of the rules is based on the tracked performance parameters and sensed the load on the server before the modification.

An advantage of the present invention is that it enables the service to manage the performance of a server by lowering the quality of its responses to within acceptable limits, without allocating extra resources to it even during peak load scenarios. It also enables the server to generate higher quality responses in lean usage periods. It further reduces the possibility of the server rejecting the user requests due to excessive load. Another advantage of the present invention is that the system required to realize the said performance optimization is simple and inexpensive, and does not require extensive analysis and resource planning.

BRIEF DESCRIPTION OF THE DRAWINGS

Various embodiments of the invention will hereinafter be described in conjunction with the appended drawings provided to illustrate, and not to limit, the scope of the invention, wherein like designations denote like elements, and in which.

DETAILED DESCRIPTION

The quality of the response provided by a service to a user request is dependent on the load acting on the service. For example, the quality of the service available to a customer at a restaurant including the response time to an order, is a factor of the number of customers the restaurant has to service at that time. This is also true for services like supply chains, over the phone help lines and online service platforms like information retrieval systems and networking sites.

The current state-of-the-art technologies available for performance optimization of a service platform only focus on adding more resources to meet the performance and scalability needs.

The present invention provides a method and a system for performance optimization of a service platform. The invention is based on governing the service quality by governing the quality of the response generated by the service for a user query. It provides a graded service-level-agreement (SLA) approach that automatically negotiates the service performance against quality of service while continuing to meet a set of base SLAs that are mandatory for the service. The current method and system can also be applied to a cloud or grid computing scenario, to reduce the need for adding or activating more resources in the system.

For the purpose of this description, the invention has been elaborated below as it is used in an on-line service platform. However, it will be apparent to those skilled in the art that the method and system of the present invention can be as conveniently used in other applicable industry verticals also.

Figure 1:
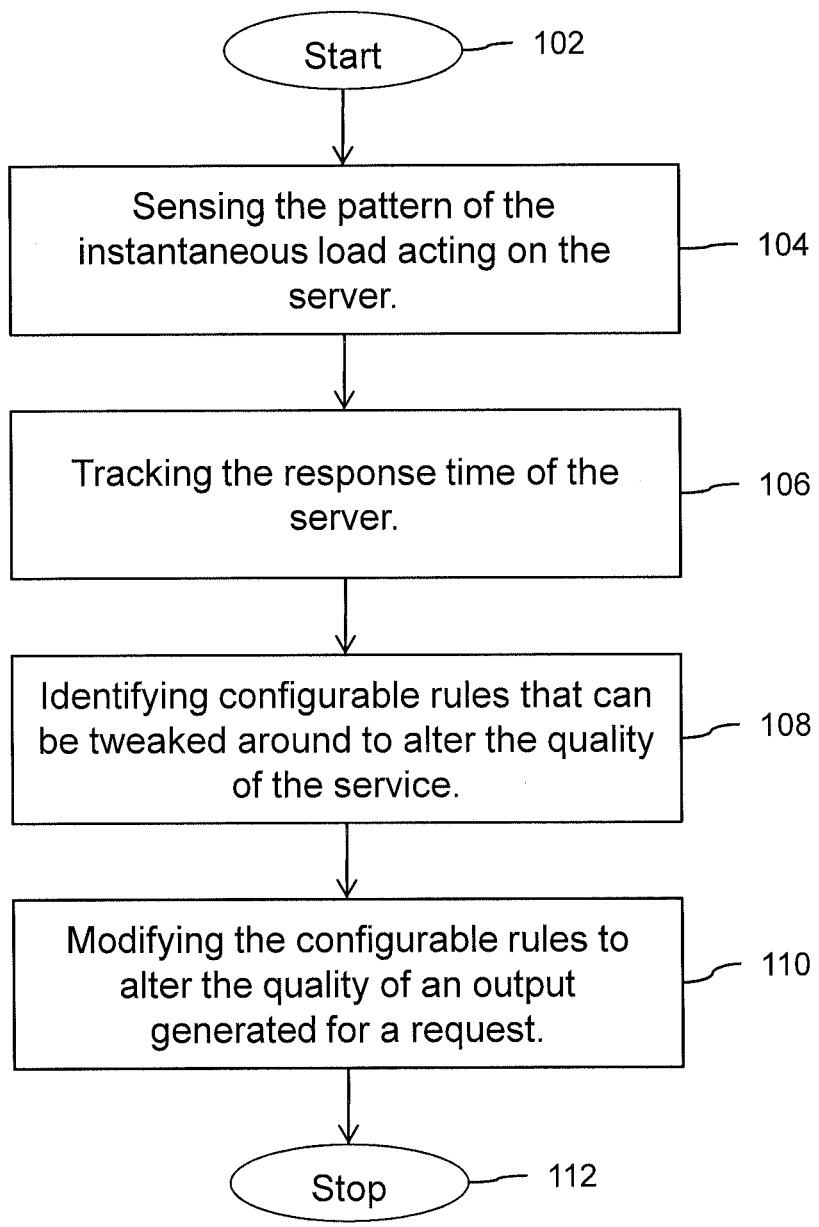
FIG. 1 is a flowchart of a method for managing performance of a server, in accordance with an embodiment of the invention.

FIG. 1 illustrates a flowchart 100 of a method for managing performance of a server, in accordance with an embodiment of the invention. The method is initiated at step 102. At step 104, the pattern of the instantaneous load acting on the server is sensed. The load pattern can be sensed at regular, predefined intervals of time. The load on the server is primarily based on factors such as number of requests received by the server, size of each request, amount of processing required for different kind of requests etc. At step 106, the performance parameters of the server are tracked. The performance parameters of the server can include the response time of the server for a particular request, which is the time taken by the server to provide an output for that request. The parameters can also include rejection rate of the server, which is the rate at which the server is rejecting requests due to overload or fatigue. Another parameter that can be included is the amount of undesirable results or garbage that a server furnishes in response to a request. It will be apparent to those skilled in the art, that the set of performance parameters is not restricted to those mentioned above and can include any parameter that is a function of the load acting on the server. In an embodiment, steps 104 and 106 are performed simultaneously. The tracked performance parameters of the server are analyzed using various matrices providing a comparison of average or worst case parameters with factors such as peak loads, user clusters etc. These matrices can be pre-loaded into the server infrastructure. In another embodiment, these matrices can be dynamically created or updated by the server using attributes of the requests already served. At step 108, various configurable rules, that can be tweaked around to attain the desired performance parameters and server load, are identified. These rules govern the quality of the output generated for a request. A default set of rules is generally pre-set into the server infrastructure. These default rules define the quality of the output that will be serviced to a user when the load acting on the server and the performance parameters of the server are within the permissible limits. The identification of the configurable rules, out of the default set, for a particular request, is dependent on the request definition provided by the user and the various SLAs governing the server. At step 110, the configurable rules are modified to alter the quality of an output generated for a request. This in turn helps in achieving a desired load and performance. Step 110 may comprise the following modifications. First is the modification of the mapping mechanism of the server. The mapping mechanism is used to identify an appropriate output or response for a given request. The mapping mechanism has been described in detail later in the description. Another modification can be the filtering of sources that are used for collecting the response. Yet another modification can be varying a number of attempts made to collect data from a source. Yet another modification can be varying the number of user preferences to be incorporated while serving the user's request. Another modification could be modifying a weight value assigned to the sources used for collecting the response where the weight value of a source corresponding to the amount of data fetched from the source to form the response. Yet another modification can be modifying the set of post-processing operations that are carried out on the response after it has been collected and collated. Yet another modification can be varying the number of results or the amount of data used to collate the response to a request. Another common modification can be varying a number of associated data points retrieved from the source corresponding to the response. Yet another modification can be modifying the attributes of the user interface of the service. It will be readily apparent to a person of ordinary skill in the art that methods other than above, that can alter the quality of the service, can be used in the present invention. It will also be apparent to a person of ordinary skill in the art that all or some of the above-mentioned rules are applicable to a service depending on its industry domain. The method for managing performance of a server ends at step 112.

The above-mentioned modifications and rules have been elaborated below using an exemplary embodiment. In this embodiment, the server is an information search application such as a database search facility. The search application federates content spread across multiple independent information sources and furnishes the response to a request.

One of the primary requirements of an information search service is to support a request format that is the most intuitive, simple and convenient one for the user to specify. This necessitates the service to infer numerous factors around the service request that could affect the precision and response of the search facility. An implicit expansion of the user needs to various domains the query could be relevant in is the first of such implicit factors. The service would perform disambiguation of the user submitted request in an attempt to infer the possible meanings of the keywords used to form the search query. This is done using a mapping mechanism. In various embodiments the mapping mechanism can be based on semantics or ontology of concepts. However, it will be apparent to those skilled in the art that the mapping mechanism can be based on other similar fundamentals. In peak load scenarios, the mapping mechanism can be modified in a way to vary the accuracy of the concept locating mechanism so as to seek a complete, prefix or a partial match; in order to improve performance by governing the service quality. In lean load scenarios, the mechanism can be tweaked in the opposite manner so as to ensure highly accurate concept location.

Incorporation of preferences that are supplied explicitly by the users reflects on the inclusion or exclusion of various features the service offers. The examples of various preferences that a search service provides to a user include option to select information sources to be federated from the list of supported data sources, an option to turn on or off the various post-processing options such as clustering the output for better readability etc. The preferences of a user can be actively or passively identified. That is, the user preferences can be explicitly indicated by the user or can be inferred by the server based on user groups. Various user groups can be created on the basis of their demography, preferences, historical activity etc. However, the incorporation of these preferences generally includes complex operations in terms of extracting the settings from a persistent storage mechanism and customizing the response based on the retrieved settings. In peak load scenarios, the said incorporation of preferences could be skipped entirely; in order to improve performance by governing the service quality.

The server collects information from numerous disparate data sources of documents in different formats. In various embodiments, the server also federates third party search services to provide a unified view of the available artifacts. These inherent dependencies of the server on various sub ordinate servers and sources in turn affect the responsiveness of the server. Based on the responsiveness of these intermediate search services, the relatively sluggish sources or sub-services can be filtered and skipped all together. However, this step can be done away with in case service requestor explicitly asks for the said sluggish sub-services. The filtering of a relatively sluggish sub-service is based on a first set of parameters corresponding to the sub-service. The amount of time a service takes to respond to a request as against its average value in past and how it fares against the time taken by other such services executed in parallel are a few parameters that can be a part of the first set of parameters.

In addition to skipping the unresponsive sources, the weights considered for each source or sub-service can be tweaked in order to balance the sluggishness against amount of data being fetched. The weights assigned to a source translate to the percentage of number of results in the final response that have been fetched from that source.

The expanse of data being processed and served by the service can be another factor of consideration here. The number of search results found could be enormous for a particular request. In peak load scenarios, the responsiveness of the server is not only affected by this enormous result set, but also by the post-processing operations carried out on the result set. In such a situation, the retrieval should be restricted to a specific limited subset comprising of the most relevant items as requested by the user. Similarly, in lean load scenarios the limit to the number of results can be removed or varied accordingly.

The process of ensuring Information completeness and higher recall in the search service includes the step of making a pre-configured number of repetitive attempts to fetch data from sluggish or non-responsive sub-ordinate services or sources. This number of repetitive attempts can be varied according to the changing loads on the server and its performance parameters.

Descriptive data points and context specific attributes are retrieved around the search results to give users a brief idea about the retrieved document. For example, in case the retrieved result is an article, it can be accompanied by a relevant section of the artifact, date of creation or publication, author, etc. The number of data points and attributes can be varied depending on the load acting on the server and its responsiveness.

The collated response for a user request should be well organized for better readability. This is realized by applying a variety of post-processing operations on the retrieved response. These mainly include operations such as domain aware classification, user heuristics based clustering, keyword based ranking etc. Domain aware classification includes classifying the retrieved results on the basis of a known taxonomy in the domain of the request. User heuristics based clustering includes clustering results on the basis of user groups. Various user classifications can be created on the basis of their demography, preferences, historical activity etc. Keyword based ranking includes ranking the results on the basis of number of search terms they contain. Depending on the load on the server and its responsiveness, the various post-processing operations are interchangeably or simultaneously used.

The clustering algorithms generally use a search result snippet comprising primarily of information like document title, the context specific summary of the document etc. for identifying the clusters. The completeness and accuracy of these algorithms depend on the number of information points used to form the snippet which is used to identify the overlap between documents. More descriptive the snippet, more accurate and deep is the categorization or clustering. However, the complexity of these algorithms is also directly proportional to the descriptiveness of the snippet. Thus, amount of data points being considered for snippet generation, snippet size and the number of documents used for clustering algorithms can also be varied depending load conditions and server responsiveness. Also, in case of User heuristics based clustering, the classification of users making the requests can be used to modify the algorithms. In addition the server performance can also be used to decide the accuracy of numerical computations done using the execution of these algorithms.

The user interface generation for the search results page or the search server is also one of the phases of an information search service that affects the load on the service and its responsiveness. Hence, the varying load scenarios can also be counteracted by varying the degree to which various user interface attributes are utilized. These attributes can include multimedia elements, styling techniques etc.

The overall responsiveness can also be improved if a plurality of similar dependent elements of a user interface page is bundled during transfer from the server side to the user. Examples of dependent elements include style sheets, images, client side scripts, etc.

As described above, the various configurable rules and sub-services have interdependencies on each other. Hence, a communication mechanism is set up amongst these rules and sub-services to attain a collective effect of optimizing the rules and sub-services according to the server load conditions and responsiveness.

The identified configurable rules for varying the service quality as described above are defined and stored in a structured format, for example, as that of the Extensible Markup Language (XML). Further, they are initialized with default values that conform to the best SLAs shared with the user or consumer of the service with no compromise on the service quality. For example, the boot-strap loader of the application that hosts the service, refers to this configuration file and loads the values in its quickest accessible memory close to the processing system in an attempt to avoid extra performance hit that could have been caused by referring to the persistent storage frequently. The afore-mentioned values are also shared across various instantiations of the service and the plurality of parallel service users as they have to be considered for variation when the service performance fluctuates.

Figure 2:
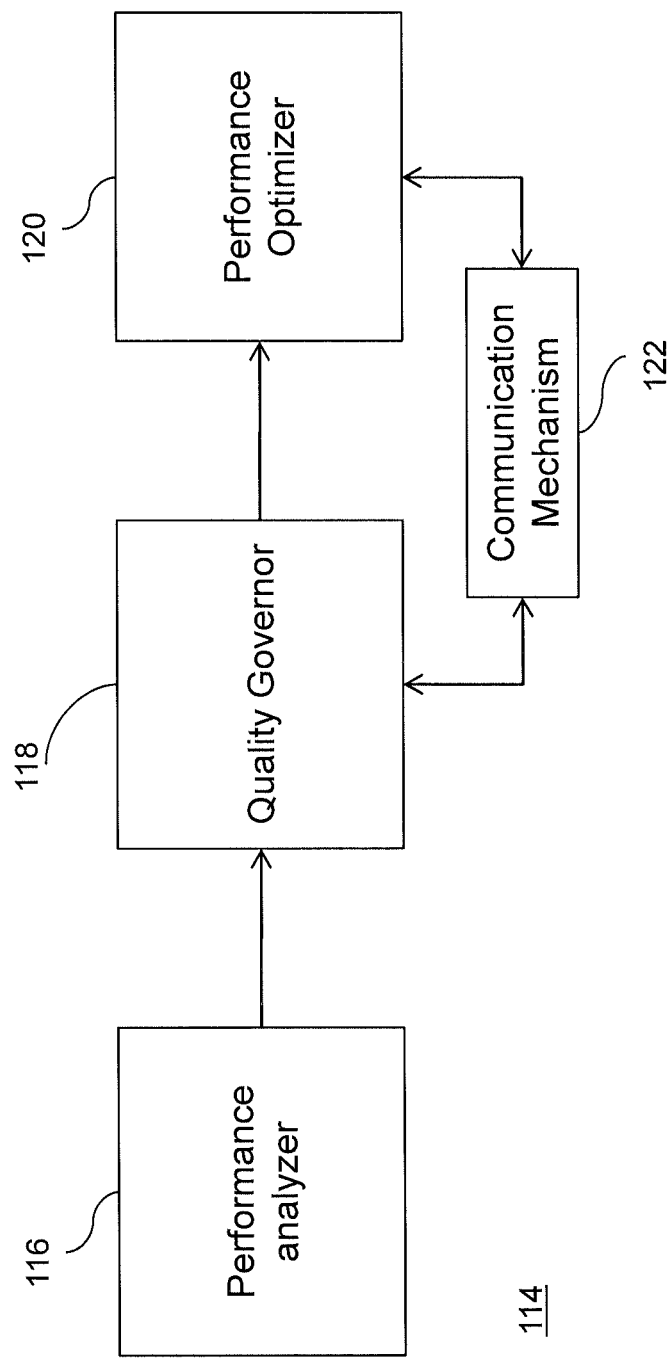
FIG. 2 is a block diagram of a system for managing performance of a server, in accordance with an embodiment of the invention.

FIG. 2 illustrates a block diagram 114 of a system for managing performance of a server, in accordance with an embodiment of the invention. Block 116 represents a performance analyzer. Performance analyzer 116 senses the pattern of the instantaneous load acting on the server and tracks the performance of the server. These functions are as described in FIG. 1. Block 118 represents a quality governor. The quality governor identifies the configurable rules that are to be modified to alter the quality of the response to a request. The identification of configurable rules is as described in FIG. 1. Block 120 represents a performance optimizer. The performance optimizer modifies the configure rules to alter quality of the response based on the load and the response time of the server. This modification is as described in FIG. 1. In an embodiment, the system can also include a Communication Mechanism 122 that couples the performance optimizer 120 and the quality governor 118. The exchange of data between the performance optimizer 120 and the quality governor 118 using the Communication Mechanism 122, ensures that the various rules and sub-services of the server can be customized real time.

The method and system for managing performance of a server described above have a number of advantages. The method and system of the present invention, do not rely on adding more resources to meet the performance and scalability needs of a server. It ensures that the possibility of the server rejecting the user requests due to excessive load is reduced to a minimum. The performance of the service platform is optimized using the existing resources and at the condition that the base Service Level Agreements (SLAs), that are mandatory for the service are fulfilled. The present invention also enables the server to generate high quality responses in lean usage periods. Another advantage of the present invention is that the system required to realize the said performance optimization is simple and inexpensive, and does not require extensive planning.

The system for managing performance of a server, as described in the present invention, or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for optimizing the performance of a server by varying the quality of service provided by it. The computer program product includes a computer usable medium having a set program instructions comprising a program code for optimizing server performance. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions, and equivalents will be apparent to those skilled in the art without departing from the spirit and scope of the invention as described in the claims.

The invention claimed is:

1. A method for managing performance of a server, the server receiving a plurality of requests from one or more users and generating an output for each request received by using one or more resources, the method comprising:
dynamically monitoring instantaneous load on the server at predefined intervals of time;
continuously tracking a set of performance parameters of the server, the set of performance parameters comprising:
(i) weights assigned to one or more sub-ordinate servers and resources upon which the server inherently depends for collecting and collating intermediary results to generate the output, and
(ii) ratio of response time of one sub-ordinate server to response time of another sub-ordinate server of the one or more subordinate servers;
identifying configurable rules that governs quality of the output generated for the request received; and
modifying the configurable rules to alter quality of the output based on the instantaneous load and the set of performance parameters, the quality of output being altered by lowering the quality of the output to within acceptable limits as defined in a set of base SLAs (Service Level Agreements) and without adding more resources, wherein the modification of the configurable rules includes:
modifying a mapping mechanism to identify and map a relevant result upon identifying any undesirable result being generated by the server in response to the request received, and
modifying the weights assigned to one or more sub-ordinate servers and resources.

2. The method according to claim 1, further comprising comparing the performance parameters with a set of pre-recorded performance parameters.

3. The method according to claim 1, wherein the set of performance parameters includes at least one of response time of the server, rejection rate of the server, and undesirable response of the server.

4. The method according to claim 1, wherein the modification of the mapping mechanism is used to determine a relevance of the response to the request, the modification of the mapping mechanism is carried out on the basis of user history and preference.

5. The method according to claim 1, wherein the mapping mechanism is based on at least one of semantics and ontology of concepts.

6. The method according to claim 1, wherein the modification of rules further comprises filtering and skipping the one or more sub-ordinate servers and resources used for collecting data on the basis of the ratios of response time from one or more sub-ordinate servers.

7. The method according to claim 1, wherein the modification of rules comprises varying a number of attempts made to collect data from a source on the basis of a first set of parameters corresponding to each source.

8. The method according to claim 7, wherein the first set of parameters comprises at least one of a response time of the source and a ratio of response time of the source to a response time of another source.

9. The method according to claim 1, wherein the weight value of a source is amount of data fetched from the source to form the output.

10. The method according to claim 1, wherein the modification of rules comprises modifying a set of post-processing operations carried out on the response.

11. The method according to claim 10, wherein the modification in the set of post processing operations is based on a user classification.

12. The method according to claim 10, wherein the post-processing operation is a categorization of data that forms the output.

13. The method according to claim 1, wherein the modification of rules comprises modifying a number of associated data points retrieved from the source corresponding to the output.

14. The method according to claim 13, wherein the associated data points are at least one of a publication date and author name.

15. The method according to claim 1, wherein the server is an information search server.

16. The method according to claim 1, wherein the modification of rules comprises modifying a user interface of the server.

17. A system for managing performance of a server, the server receiving a plurality of requests from one or more users and generating an output for each request received by using one or more resources, the system comprising:
- a performance analyzer for dynamically monitoring instantaneous load on the server at predefined intervals of time and continuously tracking a set of performance parameters of the server, the set of performance parameters comprising:
  - (i) weights assigned to one or more sub ordinate servers and resources upon which the server inherently depends for collecting and collating intermediary results to generate the output, and
  - (ii) ratio of response time of one sub-ordinate server to response time of another sub-ordinate server of the one or more subordinate servers;
- a quality governor for identifying configurable rules that govern quality of the output generated for the request received; and
- a performance optimizer for modifying the configurable rules to alter quality of the output based on the instantaneous load and the performance parameters, the quality of output being altered within acceptable limits as defined in a set of base SLAs (Service Level Agreements) and without adding more resources, wherein the performance optimizer modifies the configurable rules by:
  - modifying a mapping mechanism to identify and map a relevant result upon identifying any undesirable result being generated by the server in response to the request received, and
  - modifying the weights assigned to one or more subordinate servers and resources.

18. The system according to claim 17, wherein the performance analyzer also compares performance parameters with a set of pre-recorded performance parameters.

19. The system according to claim 17, wherein the set of performance parameters includes at least one of response time of the server, rejection rate of the server, and undesirable response of the server.

20. The system according to claim 17, further comprising a communication mechanism, the communication mechanism communicatively coupling the performance analyzer and the quality governor.

* * * * *